United States Patent [19]

Parks

[11] Patent Number: 5,222,233

[45] Date of Patent: Jun. 22, 1993

[54] METHOD FOR RESTRUCTURING A DATABASE USING A RELATIONAL DATABASE SCHEME DERIVED BY SELECTING SUBSCHEME JOINS TO AVOID CYCLES

[75] Inventor: Allen D. Parks, Fredericksburg, Va.

[73] Assignee: The United States of America as represented by the Secretary of the Navy, Washington, D.C.

[21] Appl. No.: 551,104

[22] Filed: Jul. 9, 1990

[51] Int. Cl.⁵ .................... G06F 15/40; G06F 15/401
[52] U.S. Cl. .................................... 395/600; 395/700;
        364/DIG. 1; 364/282.1; 364/283.4
[58] Field of Search ............... 364/200, 900; 395/600, 395/700

[56] References Cited

U.S. PATENT DOCUMENTS

| | | | |
|---|---|---|---|
| 4,497,037 | 1/1985 | Kato et al. | 364/900 |
| 4,498,145 | 2/1985 | Baker et al. | 395/600 |
| 4,514,826 | 4/1985 | Iwata et al. | 364/900 |
| 4,627,019 | 12/1986 | Ng | 395/600 |
| 4,881,166 | 11/1989 | Thompson et al. | 364/200 |

Primary Examiner—Thomas C. Lee
Assistant Examiner—Wayne Amsbury
Attorney, Agent, or Firm—John D. Lewis; Jacob Shuster

[57] ABSTRACT

A method for relational database scheme design with the aid of a digital computer for a database having attributes $A_i$, $i=1$ to n and relational schemes $R_j$, $j=1$ to m. Each relational scheme $R_j$ is a non-empty subset of the attributes $A_i$. The method detects any scheme that is non-acyclic in a simple manner that is easily adapted to a digital computer environment. The resulting relational database scheme design is thereby prevented from being non-acyclic.

6 Claims, 2 Drawing Sheets $R_1 = (A,B,C)$ $R_2 = (C,D,E)$ $R_3 = (A,F,E)$ $C1(R_1) = ((A,B,C),(A,B),(A,C),(B,C),(A),(B),(C))$ $C1(R_2) = ((C,D,E),(C,D),(C,E),(D,E),(C),(D),(E))$ $C1(R_3) = ((A,F,E),(A,F),(A,E),(F,E),(A),(F),(E))$ $C1(S) = C1(R_1) \cup C1(R_2) \cup C1(R_3)$ $= ((A,B,C),(C,D,E),(A,F,E),$ $(A,B),(A,C),(B,C),(C,D),(C,E),(D,E),(A,F),(A,E),(F,E),$ $(A),(B),(C),(D),(E),(F)$

FIG. 1

METHOD FOR RESTRUCTURING A DATABASE USING A RELATIONAL DATABASE SCHEME DERIVED BY SELECTING SUBSCHEME JOINS TO AVOID CYCLES

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

This invention relates to relational database schemes and in particular to a method for designing relational database schemes with the aid of a digital computer.

DESCRIPTION OF THE PRIOR ART

In recent years, much research has been devoted to the study of acyclic relational database schemes. From an information processing perspective, it has been shown that acyclic schemes enjoy certain desirable properties such as having monotone join expressions. The existence of a monotone join expression guarantees that there is a space-efficient and time-efficient manner for taking joins so that no intermediate join has more data than the final join. A detailed discussion on monotone join expressions written by C. Beeri, R. Fagin, D. Maier and M. Yannakakis entitled "On the Desirability of Acyclic Database Schemes" can be found in the *Journal of the Association for Computing Machinery*, Vol. 30, No. 3, July, 1983, pp. 479-513. Because of the utility of an acyclic scheme, designers of relational database schemes may be concerned with the recognition of a design that is acyclic or non-acyclic. Such recognition further becomes time-critical when the database scheme is dynamic in nature and it is required that acyclic scheme integrity must be maintained as the database scheme changes with time. Examples of dynamic data bases are those that must share information with other databases, real-time databases and databases that are frequently joined.

In the past, acyclic database schemes were formed through trial and error. Elaborate reduction algorithms were then employed to recognize acyclic relational database schemes. For a discussion of these algorithms, see R. E. Tarjan and M. Yannakakis, "Simple Linear Time Algorithms To Test Chordality of Graphs, Test Acyclicity of Hypergraphs, and Selectively Reduce Acyclic Hypergraphs", *SIAM Journal of Computing*, Vol. 13, No. 3, August, 1984. However, application of these algorithms requires laborious graphical recognition or mathematical calculations which are too slow for certain time-critical relational database scheme recognition requirements. Furthermore, the graphical recognition of the prior art method is not easily adapted to run in a high-speed digital computer environment.

SUMMARY OF THE INVENTION

Accordingly, it is an object of the present invention to provide a method for designing a relational database scheme that identifies any non-acyclic relational scheme and thereby prevents the design of a non-acyclic database scheme.

It is a further object of the present invention to provide a method for designing a relational database scheme for dynamic database design applications.

A still further object of the present invention is to provide a method for designing a relational database scheme that is easily adapted to operating in a high-speed digital computer environment.

Yet another object of the present invention is to provide a method of identifying a non-acyclic relational database scheme.

Other objects and advantages of the present invention will become more apparent hereinafter in the specification and drawings.

In accordance with the present invention, a method has been developed for designing a relational database scheme with the aid of a digital computer. A database is provided that has attributes $A_i$, i=1 to n, and relational schemes $R_j$, j=1 to m. Each relational scheme $R_j$ comprises a non-empty subset of the attributes $A_i$. Any relational scheme $R_j$ that is found to produce a non-acyclic database scheme when adjoined to a database scheme can be detected. The remaining relational schemes $R_j$ are then joined resulting in a unified relational database scheme that is prevented from being non-acyclic. In addition, the method of the present invention can be used to identify any non-acyclic database scheme.

BRIEF DESCRIPTION OF THE DRAWINGS

FIG. 1 shows an example of the set relationships of the attributes in relational schemes as they are used in the design method of the present invention.

DETAILED DESCRIPTION OF THE INVENTION

Figure 2:
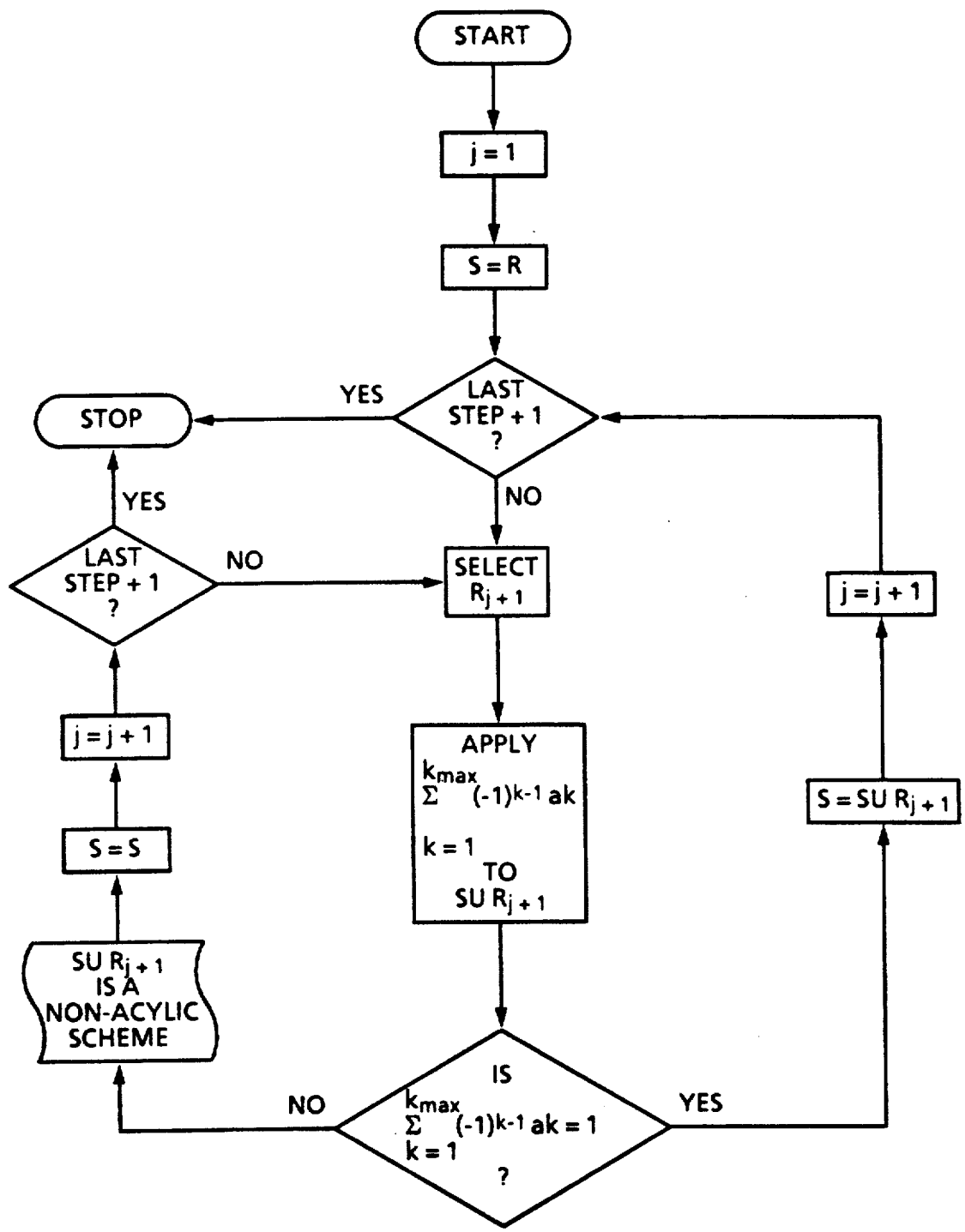
FIG. 2 is a process flow chart for the relational database scheme design according to the method of the present invention.

Although there are many designs for relational database schemes, it has been shown that acyclic relational database schemes enjoy certain desirable properties such as possessing monotone join expressions. These properties are useful when dealing with distributed database systems that are linked by a network. As these databases, often called dynamic databases, change with time, share information or become adjoined with other databases to form a unified database, acyclicity must be maintained. The method of the present invention designs a relational database scheme with the aid of a digital computer that prevents the formation of a non-acyclic database scheme.

Before describing the method of the present invention, the parameters used in the method must be defined. Accordingly, let $A_i$, i=1 to n be the attributes of a database. A relational scheme R over these attributes is a non-empty subset of them. A relational database scheme S, hereinafter referred to as a database scheme, over these attributes is a set of relational schemes $R_j$, j=1 to m, such that:

$$\bigcup_{j=1}^{m} R_j = \bigcup_{i=1}^{n} A_i \tag{1}$$

If $R_j$ is a relational scheme, then the closure of $R_j$, $Cl(R_j)$ is the family of all non-empty subsets of attributes of $R_j$.

The closure of a database scheme S, Cl(S), is the union of the closures of the relational schemes, i.e., $$Cl(S) = \bigcup_{j=1}^{m} Cl(R_j) \quad (2)$$

Each of the non-empty subsets formed by the union of the closures contains a quantity k of attributes. For the non-empty subsets, k will range from 1 to $k_{max}$ where $k_{max}$ is equal to the largest number of attributes contained in any one subset. The number of subsets having like quantities of k is denoted by $a_k$.

In order to better understand the aforementioned parameters, FIG. 1 shows a database scheme S having attributes $A_1$ through $A_6$ and relational schemes $R_1$ through $R_3$ over these attributes. For ease of description, assume $A_1$ equals A, $A_2$ equals B, etc. Referring to the closure of S, Cl(S), k ranges from 1 to 3 and $a_k$ for k equals 1 to 3 yields the following:

$a_1 = 6$ (6 subsets having 1 attribute)
$a_2 = 9$ (9 subsets having 2 attributes)
$a_3 = 3$ (3 subsets having 3 attributes).

Referring now to FIG. 2, a process flow diagram is shown for the relational database scheme design method according to the present invention. The process flow shown in FIG. 2 and described herein below is easily adapted to run on any high-speed digital computer. As an example, the method of the present invention will be described for the design of a unified database scheme. The method of the present invention will prevent the formation of a non-acyclic unified database scheme.

For sake of simplicity, assume a set of relation schemes $R_j$, $j=1$ to 3, are the single relation schemes shown in FIG. 1. A single relation scheme is simply the set of attributes which comprise column headings for a table in the database. A single relation scheme is also considered to be connected. A scheme is connected if any two distinct attributes such as A and B of $A_i$, $i=1$ to n are connected, i.e., there is a sequence of relation schemes $<R_1, R_2,...,R_q>$, $q \geq 1$, such that A is in $R_1$, B is in $R_q$, and $(R_i \cap R_{i+1})$ is non-empty for $1 \leq q \leq q-1$. Accordingly, a single relation scheme, such as $R_1$, $R_2$, or $R_3$ in FIG. 1, is connected. For database schemes, $(R_1 \cup R_2)$ is connected since $(R_1 \cap R_2)$ is non-empty while a scheme such as $\{A,B,C\} \cup \{D,E,F\}$ is non-connected or disjointed.

As a first step in the process of FIG. 2, let database S be equal to a relational scheme $R_1$. Since all single relational schemes are acyclic, S is acyclic. In the next step of the process, $R_{j+1}$ is selected. Since the goal of the method of the present invention is to prevent the design of a non-acyclic database, (S U $R_{j+1}$) must be examined. Rather than applying the graphical solutions or extensive mathematical calculations of the prior art, the design method of the present invention, with the aid of a digital computer, can quickly determine if (S U $R_{j+1}$) is non-acyclic by calculating the equation:

$$\sum_{k=1}^{k_{max}} (-1)^{k-1} a_k \quad (3)$$

where k, $k_{max}$ and $a_k$ are determined for (S U $R_{j+1}$). If the result of this calculation is not equal to 1, then (S U $R_{j+1}$) is non-acyclic. For the case shown in FIG. 1, applying this calculation to (S U $R_{j+1}$) = ($R_1$ U $R_2$), yields the value of 1 since $a_1$ equals 5, $a_2$ equals 6 and $a_3$ equals 2. Thus, the scheme is updated to S=(S U $R_{j+1}$) =($R_1$ U $R_2$) for the instant case.

The next relational scheme $R_{j+1}$ is then selected and used to update database S so that S equals (S U $R_{j+1}$)=($R_1$ U $R_2$ U $R_3$) for the instant case. However, applying the calculation of equation (3) to updated database S this time yields the value of 0 since $a_1=6$, $a_2=9$ and $a_3=3$. Since adjoining $R_3$ to S would make S non-acyclic, S does not get updated with $R_3$, or if it does, $S=(R_1 \cup R_2 \cup R_3)$ is known to be non-acyclic.

The method of the present invention applies equally as well to adjoining a series of database schemes $S_h$, $h=1$ to L, as long as that there exists at least one $S_{h+1}$ for every $S_h$ such that $(S_h \cap S_{h+1})$ is non-empty. In other words, there must be some common attribute between two of the databases to be adjoined. In such a case, the method described above could first be applied to each $S_h$. Any $S_h$ that is non-acyclic could thus be detected. Furthermore, any number of the remaining database schemes could be adjoined and then similarly be examined for non-acyclicity.

It should be pointed out that while the method of the present invention detects non-acyclic database schemes and prevents the design of a non-acyclic database scheme, it does not guarantee the design of an acyclic database. The present method is based upon homological techniques and is therefore dealing with the existence of homological "holes" in database schemes. For a detailed discussion of homological techniques, see S. T. Hu, *Homology Theory: A First Course in Algebraic Topology*, Holden-Day, Inc., San Francisco, 1966.

It has been shown that acyclic database schemes cannot have any of these "holes". Although the homology of a database scheme can be calculated, it is a very cumbersome process. The calculation of equation (3) used in the method of the present invention is much simpler to apply then the direct calculation of homology. It is easily adapted for use in a digital computer environment and would therefore have great utility in real-time processing. However, the method of the present invention guarantees only the detection of what are known as "overt holes". The updated database may still possess "covert holes", unless (S $\cap$ $R_{j+1}$) is totally contained within one of the relational schemes $R_j$ in database scheme S. In this case, no "covert holes" exist and (S U $R_{j+1}$) is guaranteed to be acyclic.

The method of the present invention has been described for designing a unified database scheme built from single relation schemes. However, it could easily be adapted to design a unified database scheme from p connected components. For example, if S={A,B,C} U {D,E,F} then p equals 2. In such a case, if the result of the calculation of equation (3) is not equal to the required number of connected components p, then the unified database scheme is non-acyclic. Furthermore, note that if a database scheme is acyclic, then each component is acyclic. Accordingly, the method of the present invention can be extended to detect non-acyclicity in a database scheme comprised of any number of connected components. Each component could be evaluated individually whereby any component that was non-acyclic would be detected and isolated from the database scheme. The resulting unified design is thus prevented from becoming non-acyclic.

The advantages of the present invention are numerous. The design method of the present invention not only prevents the formation of a non-acyclic database scheme but does so in a simple manner that has great utility in the real-time digital computer processing environment of dynamic databases. Thus, although the invention has been described relative to specific embodiments thereof, it is not so limited and numerous variations and modifications thereof will be readily apparent to those skilled in the art in light of the above teaching. It is therefore to be understood that within the scope of the appended claims the invention may be practiced otherwise than as specifically described.

What is claimed is:

1. A method for dynamically generating, with the aid of a digital computer, a relational database scheme that is prevented from being overtly non-acyclic in a homological sense, comprising the steps of:
   a) providing said computer with a database having attributes $A_i$, $i = 1$ to n, and relational schemes $R_j$, $j = 1$ to m, each relational scheme $R_j$ comprising an acyclic, non-empty subset of said attributes $A_i$;
   b) selecting a first relational scheme $R_1$ as a base relational database scheme S;
   c) initializing j to 1;
   d) selecting another relational scheme $R_{j+1}$;
   e) determining a scheme acyclicity condition of a union $(S \cup R_{j-1})$ between said base scheme S and said another relational scheme $R_{j-1}$;
   f) selectively updating said base scheme S to include the relational database scheme $R_{j-1}$ when said union's scheme acyclicity condition is not indicative of an overtly non-acyclic database scheme;
   g) incrementing j by 1; and
   h) repeating steps d) through g) for j=2 to m-1.

2. A method according to claim 1, each relational scheme $R_j$ being a single relational scheme wherein, for each non-empty subset of said union, each non-empty subset having from 1 to $k_{max}$ attributes contained therein, said step of determining comprises the steps of:
   a) generating a set $a_k$, $k = 1$ to $k_{max}$, from said union, wherein each set member $a_k$ has a value indicating the number of subsets within said union having k attributes; and
   b) calculating in said computer an equation $$\sum_{k=1}^{k_{max}} (-1)^{k-1} a_k$$

wherein each relational scheme $R_j$ is connected with all relational schemes $R_y$, $y = 1$ to m and $y \neq j$, and wherein said union is overtly non-acyclic when the result of said equation is not equal to one.

3. A method according to claim 2 wherein said union further comprises p non-connected groups of connected subsets, and wherein said union is overtly non-acyclic when the result of said equation is not equal to p.

4. A method for dynamically adjoining, with the aid of a digital computer, relational database schemes into a unified database scheme that is prevented from being overtly non-acyclic in a homological sense, comprising the steps of:
   a) providing said computer with a plurality of database schemes $S_h$, $h = 1$ to L, having attributes $A_i$ and relational schemes $R_j$, each relational scheme $R_j$ comprising an acyclic, non-empty subset of said attributes $A_i$;
   b) selecting a first database scheme $S_1$ as a base scheme S;
   c) initializing h to 1;
   d) selecting another database scheme $S_{h+1}$, wherein an intersection $(S \cap S_{h+1})$ between said base scheme S and said another database scheme $S_{h+1}$ is non-empty;
   e) determining a scheme acyclicity condition of a union $(S \cup S_{h+1})$ between said base scheme S and said another database scheme $S_{h+1}$;
   f) selectively updating said base scheme S to include the database scheme $S_{h-1}$ when said union's scheme acyclicity condition is not indicative of an overtly non-acyclic database scheme;
   g) incrementing h by 1; and
   h) repeating steps d) through g) for h=2 to L−1 to generate the unified database scheme.

5. A method according to claim 4, each relational scheme $R_j$ being a single relational scheme wherein, for each non-empty subset of said union, each non-empty subset having from 1 to $k_{max}$ attributes contained therein, said step of determining comprises the steps of:
   a) generating a set $a_k$, $k = 1$ to $k_{max}$, from said union, wherein each set member $a_k$ has a value indicating the number of subsets within said union having k attributes; and
   b) calculating in said computer an equation $$\sum_{k=1}^{k_{max}} (-1)^{k-1} a_k$$

wherein each database scheme $S_h$ is connected with all database schemes $S_y$, $y = 1$ to L and $y \neq L$, and wherein said union is overtly non-acyclic when a result of said equation is not equal to one.

6. A method according to claim 5 wherein said union further comprises p non-connected groups of connected subsets, and wherein said union is overtly non-acyclic when the result of said equation is not equal to p.

* * * * *